United States Patent
Suemitsu et al.

(10) Patent No.: US 9,065,596 B2
(45) Date of Patent: Jun. 23, 2015

(54) WIRELESS COMMUNICATION SYSTEM AND WIRELESS COMMUNICATION METHOD

(75) Inventors: Taisei Suemitsu, Tokyo (JP); Kuniyuki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1315 days.

(21) Appl. No.: 12/065,968

(22) PCT Filed: Sep. 30, 2005

(86) PCT No.: PCT/JP2005/018139
§ 371 (c)(1),
(2), (4) Date: Mar. 6, 2008

(87) PCT Pub. No.: WO2007/043108
PCT Pub. Date: Apr. 19, 2007

(65) Prior Publication Data
US 2008/0227475 A1    Sep. 18, 2008

(51) Int. Cl.
*H04L 5/00* (2006.01)
*H04W 72/08* (2009.01)
*H04J 13/16* (2011.01)
*H04W 72/04* (2009.01)

(52) U.S. Cl.
CPC .............. *H04L 5/0007* (2013.01); *H04J 13/16* (2013.01); *H04L 5/0016* (2013.01); *H04L 5/0037* (2013.01); *H04L 5/0053* (2013.01); *H04L 5/006* (2013.01); *H04L 5/0064* (2013.01); *H04W 72/0453* (2013.01); *H04W 72/08* (2013.01)

(58) Field of Classification Search
CPC ......... H04J 13/16; H04L 5/006; H04L 5/007; H04L 5/0037; H04L 5/0064; H04L 5/0016; H04L 5/0053; H04W 72/08; H04W 72/0453
USPC .................................. 370/208–210, 329, 330
See application file for complete search history.

(56) References Cited

U.S. PATENT DOCUMENTS

| 6,567,383 B1 * | 5/2003 | Bohnke .......................... 370/280 |
| 7,522,544 B2 * | 4/2009 | Cheng et al. .................... 370/310 |
| 7,567,625 B2 * | 7/2009 | Oh et al. ......................... 375/299 |
| 2002/0042275 A1 | 4/2002 | Kitazawa et al. |

(Continued)

FOREIGN PATENT DOCUMENTS

| CN | 1310893 A | 8/2001 |
| CN | 1481633 A | 3/2004 |

(Continued)

OTHER PUBLICATIONS

Keiji Tachikawa, "W-CDMA Mobile Communications System", Maruzen Company, Limited, pp. 130-134, 2001 (with partial English translation), Jun. 2001.

(Continued)

*Primary Examiner* — Christopher Grey
(74) *Attorney, Agent, or Firm* — Oblon, McClelland, Maier & Neustadt, L.L.P.

(57) ABSTRACT

The present invention relates to a radio communications system and a radio communications method, and an object of the invention is to readily reduce the occurrence of collisions of contention channels. In order to achieve the object, radio resources are assigned in different orders between one radio communication and another one radio communication.

17 Claims, 13 Drawing Sheets

(56) References Cited

U.S. PATENT DOCUMENTS

| | | | |
|---|---|---|---|
| 2003/0147358 A1* | 8/2003 | Hiramatsu et al. | 370/281 |
| 2004/0082364 A1 | 4/2004 | Kitazawa et al. | |
| 2004/0141548 A1* | 7/2004 | Shattil | 375/146 |
| 2004/0202134 A1* | 10/2004 | Khawand | 370/332 |
| 2005/0068921 A1* | 3/2005 | Liu | 370/335 |
| 2005/0078759 A1 | 4/2005 | Zhang | |
| 2005/0152466 A1* | 7/2005 | Maltsev et al. | 375/260 |
| 2005/0198672 A1* | 9/2005 | Ikeda | 725/62 |
| 2005/0201476 A1* | 9/2005 | Kim et al. | 375/260 |
| 2005/0237989 A1* | 10/2005 | Ahn et al. | 370/343 |
| 2006/0029029 A1* | 2/2006 | Jacobsen | 370/343 |
| 2006/0171479 A1* | 8/2006 | Tee et al. | 375/260 |
| 2007/0041311 A1* | 2/2007 | Baum et al. | 370/208 |
| 2009/0034456 A1* | 2/2009 | Peng et al. | 370/329 |

FOREIGN PATENT DOCUMENTS

| | | |
|---|---|---|
| JP | 2000-32565 | 1/2000 |
| JP | 2001 211189 | 8/2001 |
| JP | 2002-246974 | 8/2002 |
| JP | 2003-174426 | 6/2003 |
| JP | 2003 179522 | 6/2003 |
| JP | 2003 304214 | 10/2003 |
| JP | 2004-254335 | 9/2004 |
| JP | 2005 86479 | 3/2005 |
| JP | 2005 198215 | 7/2005 |
| JP | 2005 244958 | 9/2005 |
| JP | 2005-252786 | 9/2005 |
| WO | WO 2005/006618 A1 | 1/2005 |
| WO | WO 2005/022810 A2 | 3/2005 |

OTHER PUBLICATIONS

Office Action issued Aug. 10, 2010, in Japan Patent Application No. 2007-539732 (with English-language Translation).

Office Action issued Sep. 9, 2010, in Chinese Patent Application No. 200580051734.1 (with English translation).

Extended Search Report issued Aug. 10, 2011 in Europe Application No. 05788284.7.

Japanese Office Action issued Mar. 27, 2012 in patent application No. 2010-160287 with partial English translation.

Japanese Office Action issued Sep. 25, 2012, in Japan Patent Application No. 2010-197375 (with English translation).

Combined Chinese Office Action and Search Report issued Apr. 30, 2014 in Patent Application No. 201210068322.0 (with English language translation).

Office Action issued Jun. 16, 2014 in European Patent Application No. 05 788 284.7.

Chinese Office Action dated Jan. 4, 2015 for Chinese Application No. 201210068322.0 with partial English translation.

* cited by examiner

F I G . 1
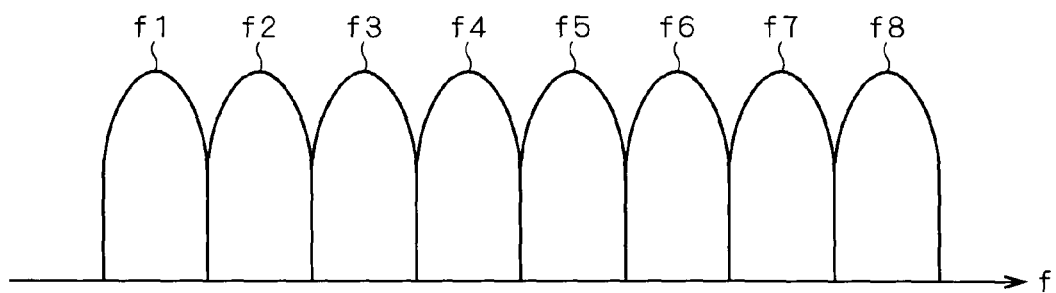
F I G . 2
| SUBCARRIER NUMBERS | 1 | 2 | 3 | 4 | 5 | 6 | 7 | 8 |
|---|---|---|---|---|---|---|---|---|
| PRIORITIES IN USER GROUP A | 1 | 2 | 3 | 4 | 5 | 6 | 7 | 8 |
| PRIORITIES IN USER GROUP B | 8 | 7 | 6 | 5 | 4 | 3 | 2 | 1 |

FIG. 7

| USER GROUP \ SUBCARRIER NUMBER | 1 | 2 | 3 | 4 | 5 | 6 | 7 | 8 |
|---|---|---|---|---|---|---|---|---|
| A | 1 | 2 | 6 | 3 | 7 | 4 | 8 | 5 |
| B | 8 | 5 | 1 | 2 | 6 | 3 | 7 | 4 |
| C | 7 | 4 | 8 | 5 | 1 | 2 | 6 | 3 |
| D | 6 | 3 | 7 | 4 | 8 | 5 | 1 | 2 |

FIG. 8

| USER GROUP \ SUBCARRIER NUMBER \ CODE NUMBER | 1 | | | | 2 | | | |
|---|---|---|---|---|---|---|---|---|
| | 1 | 2 | 3 | 4 | 1 | 2 | 3 | 4 |
| A | 1 | 2 | 6 | 3 | 7 | 4 | 8 | 5 |
| B | 8 | 5 | 1 | 2 | 6 | 3 | 7 | 4 |
| C | 7 | 4 | 8 | 5 | 1 | 2 | 6 | 3 |
| D | 6 | 3 | 7 | 4 | 8 | 5 | 1 | 2 |

FIG. 9

| USER GROUP \ SUBCARRIER NUMBER | 1 | 2 | 3 | 4 | 5 | 6 | 7 | 8 |
|---|---|---|---|---|---|---|---|---|
| A | 1 | 4 | 7 | 5 | 2 | 8 | 3 | 6 |
| B | 6 | 3 | 1 | 4 | 5 | 7 | 2 | 8 |
| C | 8 | 2 | 6 | 3 | 4 | 1 | 5 | 7 |
| D | 7 | 5 | 8 | 2 | 3 | 6 | 4 | 1 |

FIG. 12

| USER GROUP \ SUBCARRIER NUMBER | 310 | | | 320 | | | 330 | | |
| --- | --- | --- | --- | --- | --- | --- | --- | --- | --- |
| | 1 | 2 | 3 | 4 | 5 | 6 | 7 | 8 | 9 |
| A | 1 | 2 | 6 | 7 | 8 | 9 | 4 | 5 | 3 |
| B | 5 | 3 | 1 | 9 | 7 | 8 | 2 | 6 | 4 |
| C | 6 | 4 | 5 | 8 | 9 | 7 | 3 | 1 | 2 |

FIG. 13

| USER GROUP \ SUBCARRIER NUMBER | 310 | | | 320 | | | 330 | | |
| --- | --- | --- | --- | --- | --- | --- | --- | --- | --- |
| | 1 | 2 | 3 | 4 | 5 | 6 | 7 | 8 | 9 |
| A | 1 | 2 | 6 | 7 | 8 | 9 | 3 | 5 | 4 |
| B | 9 | 7 | 8 | 3 | 1 | 2 | 5 | 4 | 6 |
| C | 6 | 5 | 1 | 8 | 9 | 7 | 4 | 3 | 2 |

F I G . 1 6
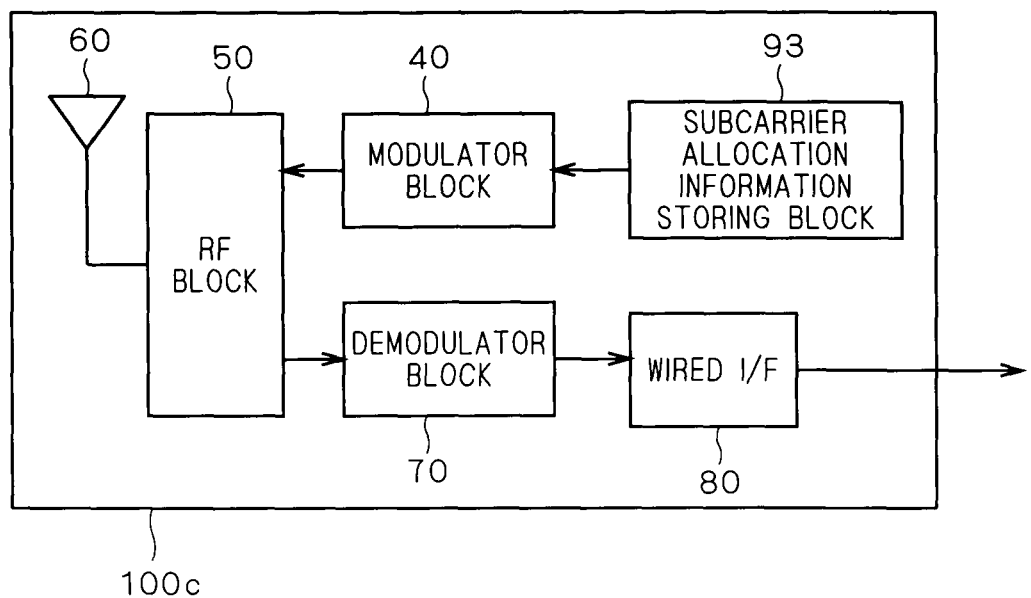
F I G . 1 7
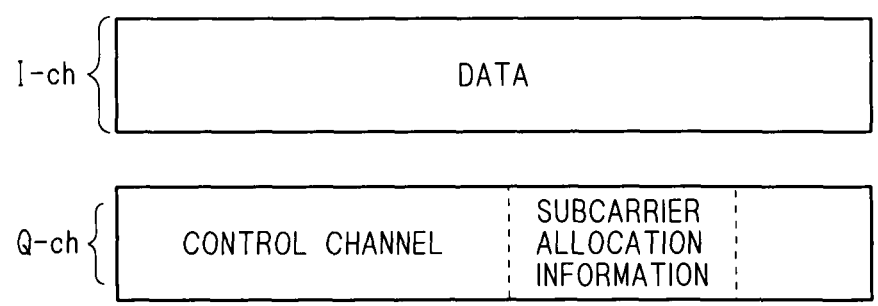

F I G . 2 1
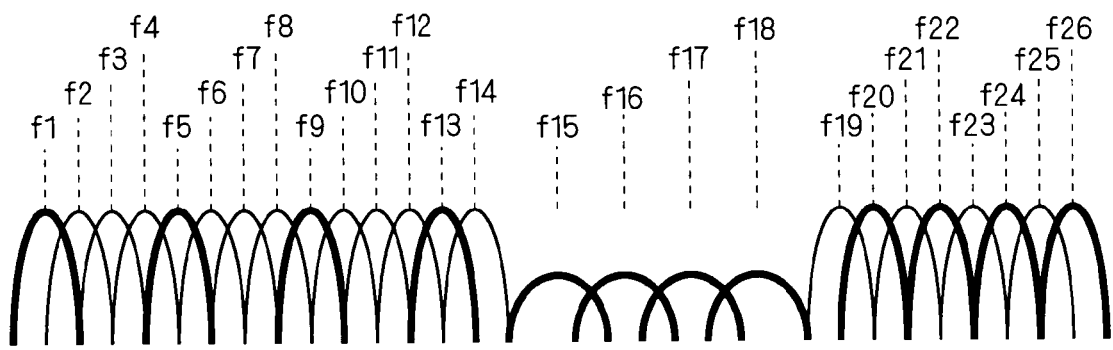

WIRELESS COMMUNICATION SYSTEM AND WIRELESS COMMUNICATION METHOD

TECHNICAL FIELD

The present invention relates to a radio communications system and a radio communications method, and particularly to a technique for simplifying device configuration.

BACKGROUND ART

Conventionally, in multi-carrier radio communications using a plurality of subcarriers, a mobile station sends, prior to data transmission, a request for permission to transmit data, by using a contention channel to the base station, and acquires a subcarrier after receiving permission. As to the contention channels, some schemes are proposed for avoiding collisions of pieces of contention data sent from a plurality of mobile stations, including a scheme that assigns time slots to individual mobile stations, and a scheme that divides the contention data into preamble and message sections, such that a mobile station sends the message section after having confirmed radio resource availability by receiving ACK/NACK etc. as a response to the preamble section (W-CDMA scheme). Such a scheme is disclosed in Non-Patent document 1, for example.

Also, Patent Document 1 discloses a scheme for avoiding collisions of pieces of contention data sent from a plurality of mobile stations, which divides data messages for every OFDM tone, and also assigns time slots for reception.

Patent Document 1: Japanese Patent Application Laid-Open No. 2001-211189.

Non-Patent Document 1: "W-CDMA Mobile Communications System" supervised by Keiji Tachikawa and published by Maruzen Company, Limited, June 2001, pp. 130-134. In Non-Patent Document 1, dividing the contention data into preamble and message sections requires complicated control, and thus requires complicated device configuration.

The technique of Patent Document 1 also requires complicated control in order to separately manage the time slots so as to avoid collisions of contention channels, and thus also requires complicated device configuration

DISCLOSURE OF THE INVENTION

The present invention has been made to solve the problems, and an object of the present invention is to provide a radio communications system and a radio communications method that are capable of readily reducing the rate of collisions of contention channels.

A first aspect of the radio communications system of the present invention is directed to a radio communications system capable of performing a plurality of radio communications by using a plurality of radio resources, wherein the radio resources are assigned in different orders between one radio communication and another one radio communication.

According to the first aspect of the radio communications system of the present invention, it is possible to readily reduce the collisions of contention channels.

A second aspect of the radio communications system of the present invention is directed to a radio communications system capable of performing a plurality of radio communications by using a plurality of subcarriers, wherein, among the plurality of subcarriers, a subcarrier having a relatively high communication quality is preferentially used as a subcarrier used for one radio communication.

According to the second aspect of the radio communications system of the present invention, it is possible to readily reduce the collisions of contention channels.

A third aspect of the radio communications system of the present invention is directed to a radio communications system capable of performing a plurality of radio communications by using a series of subcarriers in which a plurality of subcarriers are arranged in the frequency domain, wherein, in the series of subcarriers, a series of resource subcarriers, in which resource subcarriers used as radio resources in one radio communication are arranged in the frequency domain, is designated on the basis of a group of given parameters and a given operational expression.

According to the third aspect of the radio communications system of the present invention, it is possible to reduce the amount of information to be transmitted about the combination of assigned radio resources.

A fourth aspect of the radio communications system of the present invention is directed to a radio communications system capable of performing a plurality of radio communications by using a series of subcarriers in which a plurality of subcarriers are arranged in the frequency domain, wherein, in the series of subcarriers, a series of resource subcarriers, in which resource subcarriers used as radio resources for one radio communication are arranged in the frequency domain, includes a second series of resource subcarriers and a third series of resource subcarriers in which bandwidths of subcarriers are different from each other.

A first aspect of the radio communications method of the present invention is directed to a radio communications method capable of performing a plurality of radio communications by using a plurality of radio resources, wherein the radio resources are assigned in different orders between one radio communication and another one radio communication.

According to the first aspect of the radio communications method of the present invention, it is possible to readily reduce the collisions of contention channels.

A second aspect of the radio communications method of the present invention is directed to a radio communications method capable of performing a plurality of radio communications by using a plurality of subcarriers, wherein, among the plurality of subcarriers, a subcarrier having a relatively high communication quality is preferentially used as a subcarrier used for one radio communication.

According to the second aspect of the radio communications method of the present invention, it is possible to readily reduce the collisions of contention channels.

A third aspect of the radio communications method of the present invention is directed to a radio communications method capable of performing a plurality of radio communications by using a series of subcarriers in which a plurality of subcarriers are arranged in the frequency domain, wherein, in the series of subcarriers, a series of resource subcarriers, in which resource subcarriers used as radio resources in one radio communication are arranged in the frequency domain, is designated on the basis of a group of given parameters and a given operational expression.

According to the third aspect of the radio communications method of the present invention, it is possible to reduce the amount of information to be transmitted about the combination of assigned radio resources.

A fourth aspect of the radio communications method of the present invention is directed to a radio communications method capable of performing a plurality of radio communications by using a series of subcarriers in which a plurality of subcarriers are arranged in the frequency domain, wherein, in the series of subcarriers, a series of resource subcarriers, in which resource subcarriers used as radio resources for one radio communication are arranged in the frequency domain, includes a second series of resource subcarriers and a third series of resource subcarriers in which bandwidths of subcarriers are different from each other.

According to the fourth aspect of the radio communications method of the present invention, it is possible to perform communication with reduced interference.

Objects, features, aspects and advantages of the present invention will become more apparent from the following detailed description and the accompanying drawings.

BRIEF DESCRIPTION OF THE DRAWINGS

FIG. 1 A diagram illustrating frequency bands in a radio communications system according to a first preferred embodiment.

FIG. 2 A diagram illustrating priorities in the radio communications system of the first preferred embodiment.

FIG. 7 A diagram illustrating the priorities of subcarriers in the radio communications system of the first preferred embodiment.

FIG. 8 A diagram illustrating the priorities of subcarriers in the radio communications system of the first preferred embodiment.

FIG. 9 A diagram illustrating the priorities of subcarriers in the radio communications system of the first preferred embodiment.

FIG. 12 A diagram illustrating the assignment of subcarriers in the radio communications system of the second preferred embodiment.

FIG. 13 A diagram illustrating the assignment of subcarriers in the radio communications system of the second preferred embodiment.

FIG. 16 A block diagram illustrating the functions of a base station in a radio communications system according to a third preferred embodiment.

FIG. 17 A block diagram illustrating the allocation of channels in the radio communications system of the third preferred embodiment.

FIG. 21 A diagram illustrating the designation of subcarriers in a radio communications system according to a fourth preferred embodiment.

BEST MODE FOR CARRYING OUT THE INVENTION

Figure 3:
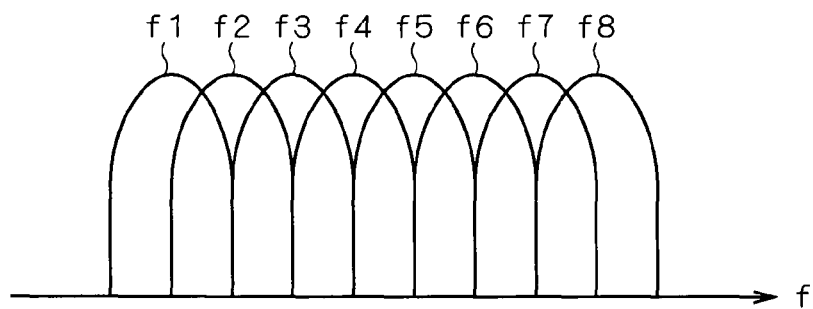
FIG. 3 A diagram illustrating frequency bands in the radio communications system of the first preferred embodiment.

Now, the preferred embodiments of the present invention will be described in detail referring to the drawings. The description below mainly shows examples in which subcarriers of FDM (including OFDM) are used as radio resources by which a plurality of mobile stations perform radio communication with a base station in a one-to-one manner, but the radio resources are not limited to FDM subcarriers, but can be time slots of TDM or codes of CDMA, for example.

First Preferred Embodiment

FIGS. 1 and 2 are schematic diagrams illustrating the operation of a radio communications system (a radio communications method) according to a first preferred embodiment. FIG. 1 shows an example in which subcarriers f1 to f8 are frequency bands of the FDM. The subcarriers f1 to f8 are assigned by a single base station to a plurality of mobile stations that are subordinate to the base station. In this specification, it is assumed that the subcarriers fn (n: an integer) have unique subcarrier numbers "n", and that the subcarrier numbers are assigned in ascending order from the lowest frequency to the highest frequency in the frequency domain.

In FIG. 2, a plurality of mobile stations are classified into two kinds of user groups A and B, and the user groups A and B are respectively assigned the priorities of the subcarriers f1 to f8. The user groups A and B are classified on the basis of information like user IDs unique to the mobile stations, their telephone numbers, etc. Smaller numbers in FIG. 2 indicate higher priorities. In FIG. 2, the priorities assigned to the user group A become lower from the subcarrier f1 to the subcarrier f8 (i.e. the priority becomes lower as the frequency becomes higher), and the priorities assigned to the user group B become higher from the subcarrier f1 to the subcarrier f8. In this way, the subcarriers f1 to f8 are assigned in such a way that the priorities differ between the user groups A and B, whereby the occurrence of collisions of contention channels is reduced in transmission of contention data from the mobile stations.

For example, when three radio resources (subcarriers) are used for transmission of one piece of contention data (in other words, when one contention channel occupies three radio resources) and one mobile station belonging to the user group A and one mobile station belonging to the user group B attempt to communicate with one base station, then the mobile station belonging to the user group A uses the subcarriers f1 to f3, and the mobile station belonging to the user group B uses the subcarriers f6 to f8, so that no collision occurs between the contention channels. In this way, the priorities for the subcarriers are assigned differently between a mobile station belonging to one user group and a mobile station belonging to the other user group, whereby collisions of contention channels can be prevented and the need for re-transmission of contention data, due to collisions, is eliminated. In FIG. 2, no collision occurs when the number of radio resources occupied by one contention channel is 8/2=4 or less.

The description above has shown an example in which the subcarriers f1 to f8 are defined by FDM as shown in FIG. 1, but this is not restrictive, and they may be defined by OFDM as shown in FIG. 3, for example. In OFDM, adjacent subcarriers are orthogonal to each other and they may overlap. Information about how the frequency bands of the subcarriers f1 to f8 are defined is sent from the base station to mobile stations by using a broadcast channel, for example. That is, the mobile stations determine which frequency bands they should use to transmit contention data, on the basis of the assigned priorities and the broadcast channel sent from the base station.

Figure 4:
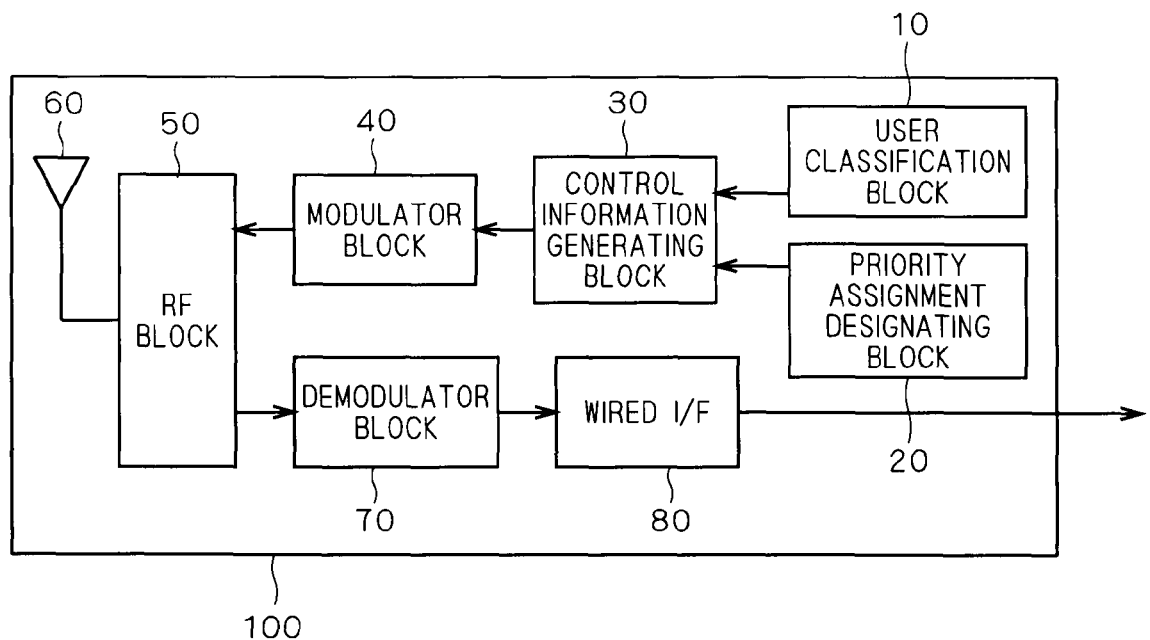
FIG. 4 A block diagram illustrating the functions of a base station in the radio communications system of the first preferred embodiment.
Figure 5:
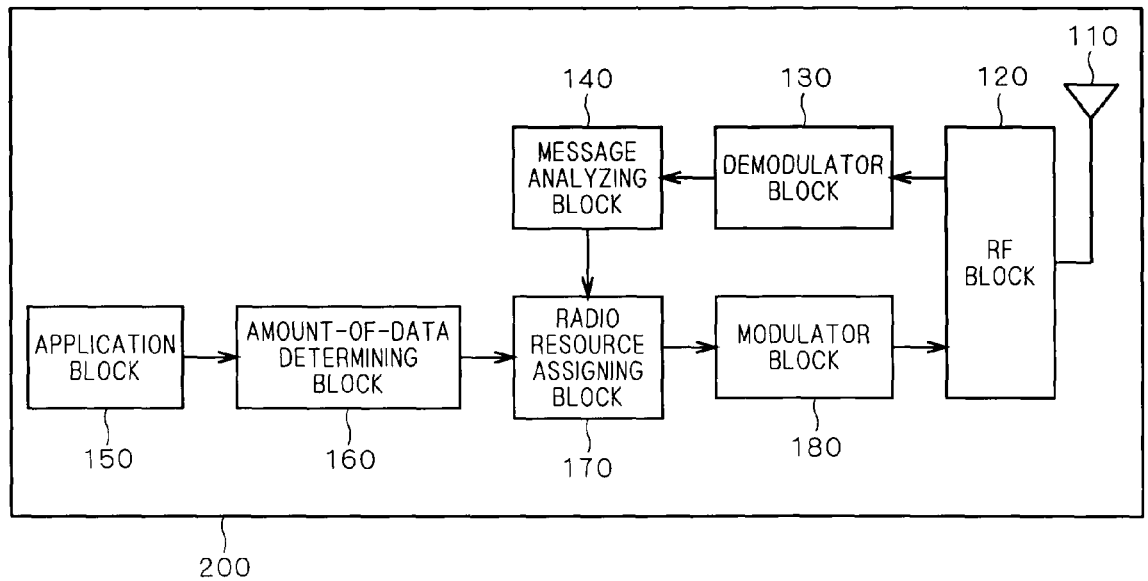
FIG. 5 A block diagram illustrating the functions of a mobile station in the radio communications system of the first preferred embodiment.

FIG. 4 is a block diagram illustrating the functions of a base station 100 in the radio communications system according to this preferred embodiment. FIG. 5 is a block diagram illustrating the functions of a mobile station 200 in the radio communications system of this preferred embodiment.

As shown in FIG. 4, the base station 100 includes a user classification block 10, a priority assignment designating block 20, a control information generating block 30, a modulator block 40, an RF block 50, an antenna 60, a demodulator block 70, and a wired I/F 80. As shown in FIG. 5, the mobile station 200 includes an antenna 110, an RF block 120, a demodulator block 130, a message analyzing block 140, an application block 150, an amount-of-data determining block 160, a radio resource assigning block 170, and a modulator block 180.

In the base station 100 shown in FIG. 4, the user classification block 10 classifies individual users (i.e. individual mobile stations 200). The priority assignment designating block 20 determines the assignment of priorities of the radio resources to the user groups A and B classified by the user classification block 10, and provides the priority information to the control information generating block 30. The control information generating block 30 generates control information of a radio format with the priority information provided from the priority assignment designating block 20, and inputs the control information to the modulator block 40. The modulator block 40 applies given modulation processing (DA conversion etc.) to the control information inputted from the control information generating block 30, and inputs the control information to the RF block 50. The RF block 50 receives the control information from the modulator block 40, and the RF block 50 up-converts the control information to a radio frequency in its built-in up-converter (not shown in FIG. 4), and transmits it to the mobile station 200 from the antenna 60.

In the mobile station 200 shown in FIG. 5, the application block 150 generates application data to be transmitted to the base station 100, such as mail, voice, video, etc. Then, on the basis of the amount of the application data generated in the application block 150, the amount-of-data determining block 160 determines the amount of contention data that is to be transmitted to the base station 100 through a contention channel, and inputs the contention data to the radio resource assigning block 170. In general, transmission of a larger amount of data requires larger power, and therefore it is preferable, in the mobile station 200, to define the upper limit of the amount of transmitted data, by considering the amount of power that can be used.

The control information transmitted from the base station 100 is received at the antenna 110, and the RF block 120 down-converts the control information to an analog baseband signal, and inputs it to the demodulator block 130. The demodulator block 130 applies given demodulation processing (AD conversion etc.) to the control information inputted from the RF block 120, and inputs it to the message analyzing block 140. The message analyzing block 140 analyzes the control information inputted from the demodulator block 130, extracts the priority information, and inputs it to the radio resource assigning block 170. Then, on the basis of the priority information inputted from the message analyzing block 140, the radio resource assigning block 170 assigns the contention data inputted from the amount-of-data determining block 160, to given radio resources as a contention channel, and inputs it to the modulator block 180. The modulator block 180 applies given modulation processing (DA conversion etc.) to the contention data inputted from the radio resource assigning block 170, and inputs it to the RF block 120. The RF block 120 up-converts, to a radio frequency, the contention data inputted from the modulator block 180, and transmits it to the base station 100 from the antenna 110.

In the base station 100 shown in FIG. 4, the contention data transmitted from the mobile station 200 is received at the antenna 60, and the RF block 50 down-converts it to an analog baseband signal in its built-in down-converter (not shown in FIG. 4), and inputs it to the demodulator block 70. The demodulator block 70 applies given demodulation processing (AD conversion etc.) to the contention data inputted from the RF block 50, and inputs it through the wired I/F 80 to a higher-order device that controls the base station 100.

Figure 6:
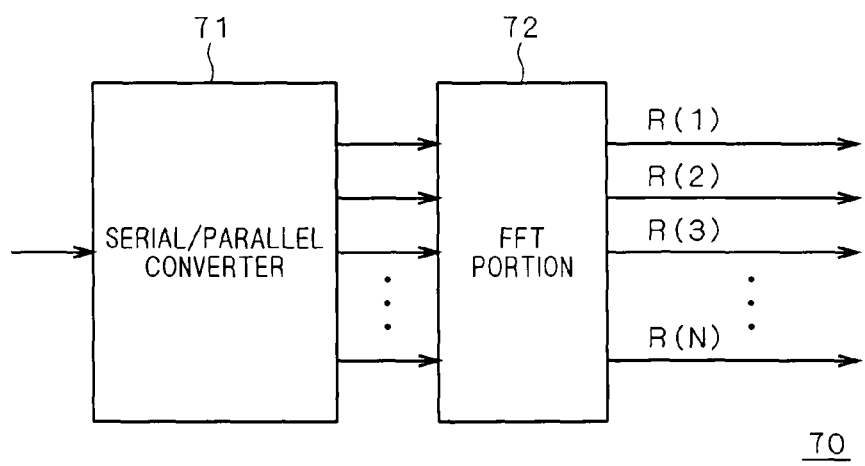
FIG. 6 A block diagram illustrating the functions of a demodulator block in the radio communications system of the first preferred embodiment.

FIG. 6 is a block diagram illustrating the function of the demodulator block 70 in an example that uses OFDM subcarriers as radio resources. As shown in FIG. 6, serial data inputted to a serial/parallel converter 71 is converted to parallel data and inputted to an FFT (Fast Fourier Transform) portion 72. The FFT portion 72 performs given demodulation processing by applying FFT to the parallel data inputted from the serial/parallel converter 71, and outputs a plurality of radio resources $R(1)$ to $R(N)$. The given demodulation processing is not limited to FFT but can be DFT (Discrete Fourier Transform).

As compared with the W-CDMA method of Non-Patent Document 1, for example, the above-described configuration allows simplified control and thus allows simplified device structure. That is, the mobile station 200 can remove the process of dividing a contention channel into preamble and message sections and sending the message section after receiving ACK for the preamble section from the base station 100. In other words, it is possible to omit the preamble section and form the contention channel only with the message section. In the W-CDMA method, a contention channel is divided into RACH (preamble) and RACH (message), and the mobile station 200 sends the RACH (message) after confirming the availability of radio resources of the base station 100 by using the RACH (preamble).

Also, by reducing the rate of collisions of contention channels, it is possible to reduce restrictions on the timing and data in the transmission of contention data from the mobile station 200. That is to say, delays are reduced because data of various sizes can be transmitted on the contention channels. Also, the radio resources can be used effectively because the contention data, which is generally of a fixed length, can be of a variable length.

The description above has shown an example in which a plurality of mobile stations are classified into two kinds of user groups A and B, but this preferred embodiment is applicable not only when the mobile stations are classified into two kinds of user groups but also when they are classified into any arbitrary number of user groups. Now, referring to FIG. 7, the assignment of priorities of subcarriers 1 to 8 to a plurality of mobile stations 200 classified into four kinds of user groups A to D will be described.

First, the number of subcarriers that can be used for transmission of one piece of contention data is calculated (in other words, the number of subcarriers that one contention channel can occupy is calculated). This number is calculated as a quotient of (the number of subcarriers/the number of user groups), which is 8/4=2 in FIG. 7.

Next, each of the user groups A to D is assigned two subcarriers (two is the number calculated as the quotient above) as the highest priorities (priorities 1 and 2). That is, the subcarriers 1 and 2 are assigned to the user group A as the highest priorities, the subcarriers 3 and 4 are assigned to the user group B as the highest priorities, the subcarriers 5 and 6 are assigned to the user group C as the highest priorities, and the subcarriers 7 and 8 are assigned to the user group D as the highest priorities.

Next, the priorities of the subcarriers 1 and 2, which have the highest priorities in the user group A, are determined in the user groups B to D. In this process, in the user groups B to D, the subcarrier 1 having the relatively higher priority "1" in the user group A is set as lower priorities (6 to 8) than the priorities (3 to 5) of the subcarrier 2 having the relatively lower priority "2" in the user group A. By setting the priorities in this way, it is possible to avoid a collision of contention channels even when one contention channel of the user group A occupies one subcarrier (1) and one contention channel of the user group B occupies five subcarriers (3, 4, 6, 8, 2), for example.

In the same way, the priorities of the subcarriers 3 and 4, having the highest priorities in the user group B, are determined in the user groups A, C and D, the priorities of the subcarriers 5 and 6, having the highest priorities in the user group C, are determined in the user groups A, B and D, and the priorities of the subcarriers 7 and 8, having the highest priorities in the user group D, are determined in the user groups A to C.

The priorities in the user groups B to D are determined according to given rules such that the priorities are fair on the whole. In FIG. 7, the priorities of the subcarriers 1 and 2 are set such that they become higher in the order of user groups B, C, D, the priorities of the subcarriers 3 and 4 are set such that they become higher in the order of user groups C, D, A, the priorities of the subcarriers 5 and 6 are set such that they become higher in the order of user groups D, A, B, and the priorities of the subcarriers 7 and 8 are set such that they become higher in the order of user groups A, B, C.

Thus, the user groups A to D are assigned different priorities according to the algorithm, so that the contention channels will not collide even when four mobile stations 200 belonging respectively to the user groups A to D each simultaneously transmit one piece of contention data that occupies two subcarriers, for example.

The description above has shown examples in which the radio resources are subcarriers as shown in FIG. 7, i.e. examples of FDM (including OFDM), but this preferred embodiment is applicable also to TDMA and CDMA. That is, this preferred embodiment is applicable to TDMA in which the subcarrier numbers of FIG. 7 are replaced by time slot numbers, and to the CDMA in which the subcarrier numbers are replaced by code numbers. Alternatively, as shown in FIG. 8, a plurality of schemes can be used in combination (FDM and CDMA in FIG. 8).

Also, the description above has shown an example as shown in FIG. 7 in which, in an arbitrary user group, the priorities 1 and 2 are assigned to subcarriers that are adjacent in the frequency domain (e.g. in the user group A, the priorities 1 and 2 are assigned respectively to the subcarriers 1 and 2 that are adjacent in the frequency domain); however, as shown in FIG. 9, for example, the priorities 1 and 2 may be assigned to subcarriers that are not adjacent in the frequency domain (e.g. in the user group A, the priorities 1 and 2 are assigned respectively to the subcarriers 1 and 5 that are not adjacent in the frequency domain). In each user group, the subcarriers that are assigned the priorities 1 and 2 are occupied when the user group transmits one piece of contention data, and assigning separated frequency bands, not adjacent each other, allows effective utilization of the multi-carrier scheme and reduction of frequency fading.

Also, the description above has shown an example in which, as shown in FIGS. 4 and 5, the amount-of-data determining block 160 of the mobile station 200 determines the amount of contention data to be transmitted to the base station 100, on the basis of the amount of application data generated in the application block 150. However, this is not restrictive; for the determination of the amount of contention data to be transmitted from the mobile station 200 to the base station 100, the base station 100 may measure the contention channels to check the condition of occupancy of the contention channels and inform the mobile station 200 about the condition in manners as described below.

Figure 10:
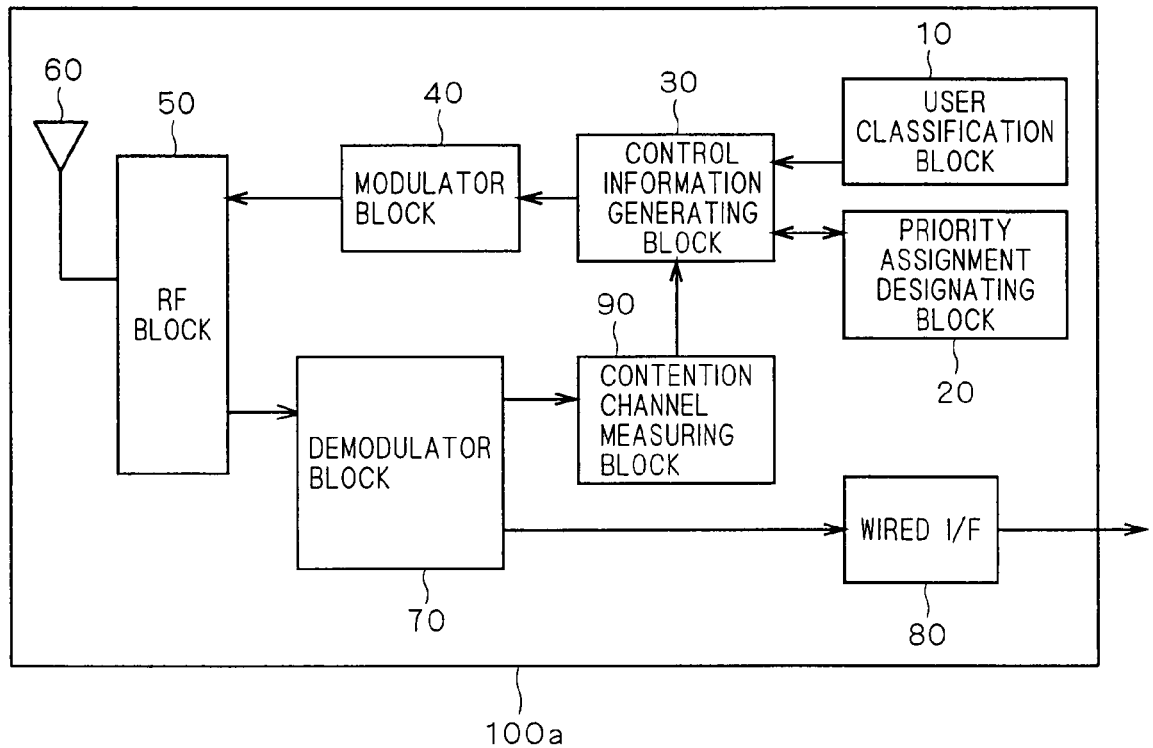
FIG. 10 A block diagram illustrating the functions of a base station in the radio communications system of the first preferred embodiment.

FIG. 10 is a block diagram illustrating the functions of a base station 100a in the radio communications system of this preferred embodiment. As compared with FIG. 4, the configuration of FIG. 10 additionally includes a contention channel measuring block 90 between the control information generating block 30 and the demodulator block 70. When contention data is inputted from the demodulator block 70, the contention channel measuring block 90 measures the communication quality etc. of the transmission paths to check the condition of occupancy, and provides occupancy information to the control information generating block 30.

The contention channels can be measured by the methods below. In the case of CDMA, where a plurality of mobile stations 200 use a same frequency, it may be done by measuring electric field strength (RSSI), or by measuring the condition of use of code numbers. In the case of TDMA, it may be done by measuring the ratio of the number of time slots being used as contention channels, to the total number of time slots assigned as the contention channels, or by measuring the condition of occupancy of time slot numbers. In the case of a multi-carrier scheme (FDM or OFDM), it may be done by measuring the ratio of the number of subcarriers being used as contention channels, to the total number of subcarriers assigned as the contention channels, or by measuring the condition of occupancy of subcarrier numbers.

With the occupancy information provided from the contention channel measuring block 90, the control information generating block 30 generates control information of a radio format, and inputs it to the modulator block 40. The quality of the control information can be enhanced by applying error correction coding or repetitive transmission, as needed, when transmitting the information to the mobile station 200. Also, as to the control information, the amount of data to be transmitted can be reduced by representing it with closest discrete values.

Also, in the case of CDMA, the demodulation processing in the mobile stations 200 can be facilitated by assigning the control information to a given code that is used in common by the mobile stations 200 using the contention channels. Also, delay can be reduced by transmitting the control information as Layer 1 (physical layer) data. Also, the demodulation processing in the mobile stations 200 can be facilitated and delay can be reduced, in the case of TDMA, by assigning the control information to a given time slot in place of a given code, and by assigning the control information to a given subcarrier in place of a given code in the case of a multi-carrier scheme (FDM or OFDM).

In the mobile station 200 shown in FIG. 5, the message analyzing block 140 extracts the occupancy information by analyzing the control information, and inputs it to the radio resource assigning block 170. Then, on the basis of the occupancy information inputted from the message analyzing block 140, the radio resource assigning block 170 assigns contention data, inputted from the amount-of-data determining block 160, to given radio resources as a contention channel.

In this process, the radio resource assigning block 170 refers to the occupancy information and assigns the contention data to available radio resources, while adjusting the amount of contention data. This lowers the rate of collisions of contention channels.

The amount of data can be adjusted by the methods below. When electric field strength is given in the case of CDMA, the maximum amount of data can be determined by considering the receiving ability of the base station 100. In the case of TDMA, the maximum amount of data can be determined by considering the ratio of the number of time slots being used as contention channels, to the total number of time slots assigned as the contention channels. In the case of a multi-carrier scheme (FDM or OFDM), the maximum amount of data can be determined by considering the ratio of the number of subcarriers being used as contention channels, to the total number of subcarriers assigned as the contention channels. The rate of collisions of contention channels can be further lowered by canceling the transmission when the assignment to radio resources is still difficult even after the amount of data has been adjusted.

In this way, in the radio communications system and radio communications method according to this preferred embodiment, a plurality of subcarriers are assigned to a plurality of user groups in such a way that their priorities differ. This lowers the rate of collisions of contention channels. As compared with the W-CDMA, this eliminates the need for dividing the contention data into preamble and message sections, and receiving data in time slots managed by the base station, whereby simpler device configuration is enabled.

In general, when one base station and a plurality of mobile stations send/receive data of various media in radio packets, the amount of data may vary depending on time, as with Web browsing packet data, or multiple kinds of packets of different data sizes may be handled. In such radio communications, frequencies are uselessly occupied when each mobile station is assigned a given amount of radio resource, and it is therefore preferable to use contention channels to avoid this. In the W-CDMA, mobile stations are always sending, with DPCCH, a signal made of a preamble section for optimization of demodulation and transmission power, but this preferred embodiment eliminates the need for transmission of such a signal and reduces power used in the mobile stations.

The description above has shown examples that use a multi-carrier scheme (FDM or OFDM), CDMA, or TDMA alone, but they may be used in combination, in which case the above-described methods are used in combination.

Also, the above-described way of setting the priorities of radio resources assigned to user groups is applicable not only when the base station 100 uses a multi-carrier scheme but also when the mobile stations 200 use a multi-carrier scheme (which applies also to the second and following preferred embodiments).

Also, the description above has illustrated the assignment of radio resource priorities for contention channels, but the preferred embodiment is applicable not only to contention channels but also to channels of other kinds (which applies also to the second and following preferred embodiments).

Second Preferred Embodiment

In general, the subcarriers in a multi-carrier scheme (FDM or OFDM) have a transmission path characteristic that depends on frequency. The transmission path characteristic may therefore be considered when assigning the subcarriers as radio resources.

Figure 11:
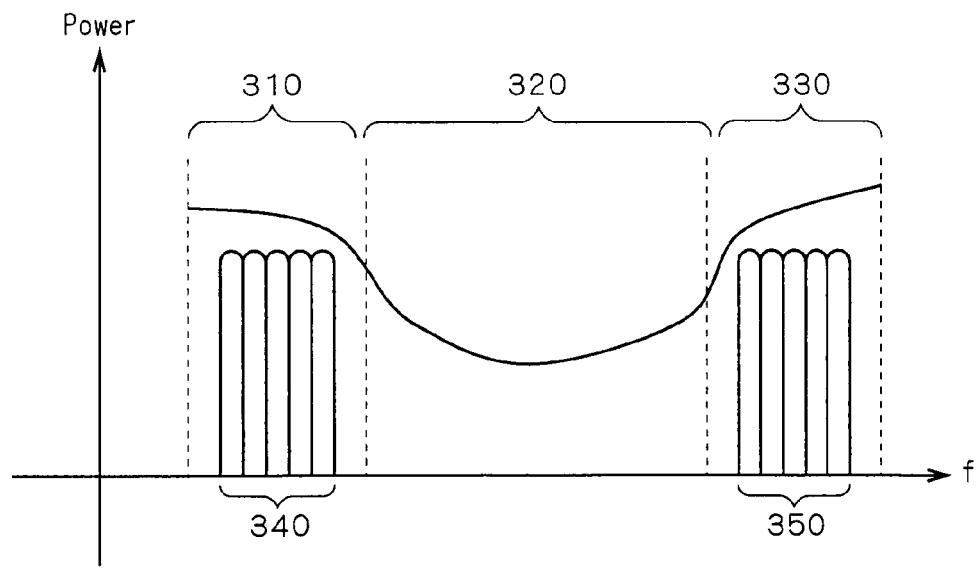
FIG. 11 A diagram illustrating the assignment of subcarriers in a radio communications system according to a second preferred embodiment.

FIG. 11 is a diagram illustrating the assignment of subcarriers in a radio communications system according to a second preferred embodiment. In FIG. 11, the bands 310 and 330 have high communication quality (receiving sensitivity), and the band 320 has low communication quality. In this case, the quality of communications can be enhanced by preferentially using the bands 310 and 330 as radio resources, than using the band 320 (by assigning the series of subcarriers 340 and the series of subcarriers 350). In this specification, an arrangement of a plurality of subcarriers at equal intervals in the frequency domain is referred to (simply) as a series of subcarriers.

The transmission path characteristic can be estimated, in the base station 100, by measuring the communication quality with an average value of all contention channels received from mobile stations 200 for each band of a given width, for example. Alternatively, in a synchronous detection (sub-synchronous detection) system, for example, the transmission path characteristic can be estimated, in the base station 100, by using a carrier wave reproduction circuit to obtain a phase difference between a known sequential signal (e.g. Pilot signal in W-CDMA) contained in the contention data and the known sequential signal which is actually measured. The transmission path characteristic is reported from the base station 100 to the mobile stations 200. Now, referring to FIGS. 5 and 10, the assignment of subcarriers of this preferred embodiment will be described.

In the base station 100a shown in FIG. 10, the contention channel measuring block 90 measures the quality, e.g. by measuring electric field strength as described earlier, with the contention data inputted from the demodulator block 70. Then, according to the measurements, the quality of each band can be measured by obtaining an average for each band of a given width. The measured quality of each band is provided to the control information generating block 30 as quality information.

Receiving the quality information from the contention channel measuring block 90, the control information generating block 30 provides the quality information to the priority assignment designating block 20. Then, on the basis of the quality information provided from the control information generating block 30, the priority assignment designating block 20 determines the assignment of priorities of the radio resources to the user groups, only in the bands 310 and 330 of high communication quality, and provides the priority information to the control information generating block 30.

In the mobile station 200 shown in FIG. 5, in the manner described in the first preferred embodiment, the radio resource assigning block 170 receives the priority information from the message analyzing block 140, assigns the contention data from the amount-of-data determining block 160 to given radio resources as a contention channel, and inputs it to the modulator block 180. The modulator block 180 applies given modulation processing (DA conversion etc.) to the contention data inputted from the radio resource assigning block 170, and inputs it to the RF block 120. The RF block 120 receives the contention data inputted from the modulator block 180, up-converts the contention data to a radio frequency, and transmits it to the base station 100 from the antenna 110.

The description above has shown an example in which the base station 100a determines the priorities on the basis of the communication quality of each band, and sends it as priority information to the mobile station 200; however, this is not restrictive, and the base station 100a may send only the quality information, as the quality of communication measured for each band, to the mobile station 200, for example. In this case, on the basis of the quality information received, the mobile station 200 will transmit the contention data by using the bands 310 and 330 only.

FIG. 12 is a diagram illustrating the assignment of subcarriers in the radio communications system of this preferred embodiment. In FIG. 12, nine subcarriers 1 to 9 are assigned to three kinds of user groups A to C. The subcarriers 1 to 3 belong to the band 310 of high communication quality, the subcarriers 4 to 6 belong to the band 320 of low communication quality, and the subcarriers 7 to 9 belong to the band 330 of high communication quality. In this case, as shown in FIG. 12, the subcarriers 1 to 3 and 7 to 9 are assigned relatively high priorities 1 to 6, and the subcarriers 4 to 6 are assigned relatively low priorities 7 to 9. Then, in each of the bands of high communication quality (subcarriers 310, 330) and in the band of low communication quality (subcarriers 320), the priorities for the user groups A to C are determined according to given rules, as shown in FIG. 7, such that the priorities are fair on the whole.

Thus, the priorities are assigned according to the above-described algorithm such that the priorities differ among the user groups A to C, whereby collisions of contention channels are prevented even when three mobile stations 200 belonging respectively to the user groups A to C simultaneously transmit contention data, as long as the transmission of one piece of contention data uses two or less subcarriers (in other words, when one contention channel occupies two or less subcarriers), for example. In this case, no collision of contention channels occurs when the user A uses three subcarriers for the transmission of one piece of contention data, the user B uses two subcarriers, and the user C uses one subcarrier. Also, in this case, when the user A uses three subcarriers for the transmission of one piece of contention data, the user B uses two subcarriers, and the user C uses two subcarriers, then a collision of contention channels occurs on the subcarrier 9 between the contention channels of the user A and the user C.

FIG. 13 shows an assignment of subcarriers, in a situation like that of FIG. 12, where the quality of communication differs not only depending on frequency but also on user group. In FIG. 13, at the subcarriers 1 to 3 (i.e. in the band 310), the user groups A and C have high communication quality and the user group B has low communication quality, and at the subcarriers 4 to 6 (i.e. in the band 320), the user group B has high communication quality and the user groups A and C have low communication quality, and at the subcarriers 7 to 9 (i.e. in the band 330), the user groups A to C have high communication quality. In this case, as shown in FIG. 13, at the subcarriers 4 to 6, the priorities of the user group B are set relatively high as 1 to 3, and the priorities of the user groups A and C are set relatively low as 7 to 9; at the subcarriers 1 to 3, the priorities of the user group B are set relatively low as 7 to 9. Then, in the bands 310 and 330 where the user groups A and C have high communication quality, and in the band 320 where the user groups A and C have low communication quality, the priorities of the user groups A to C are determined according to given rules, as shown in FIG. 7, in such a way that the priorities are fair on the whole.

Thus, the priorities are assigned according to the algorithm as shown above in such a way that the priorities differ among the user groups A to C, whereby collisions of contention channels are prevented when three mobile stations 200 belonging respectively to the user groups A to C simultaneously transmit contention data, as long as the transmission of one piece of contention data uses three or less subcarriers (in other words, as long as one contention channel occupies three or less radio resources), for example.

The description above has illustrated an example in which, as shown in FIG. 10, the quality of each band is measured by obtaining an average for each band of a given width. However, this is not restrictive, and the quality of communication can be measured for each subcarrier, for example.

Figure 14:
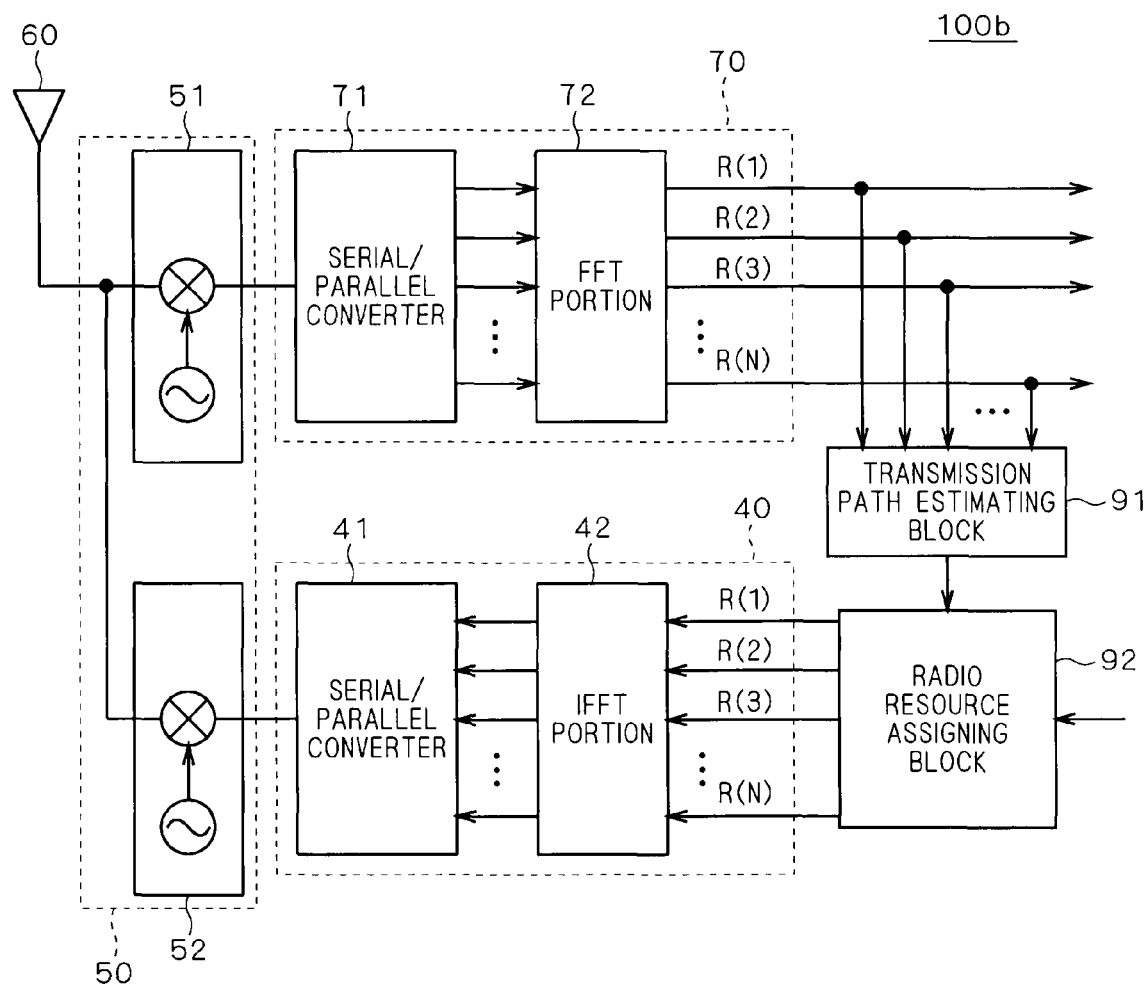
FIG. 14 A block diagram illustrating the functions of a base station in the radio communications system of the second preferred embodiment.

FIG. 14 is a block diagram illustrating the functions of a base station 100b that uses OFDM subcarriers as radio resources. As compared with FIG. 10, the configuration of FIG. 14 includes a transmission path estimating block 91 and a radio resource assigning block 92 between the demodulator block 70 and the modulator block 40 (for the sake of convenience, some parts are not shown).

In FIG. 14, the RF block 50 includes a down-converter 51 for down-converting the contention data received at the antenna 60 into an analog baseband signal, and inputting it to the demodulator block 70, and an up-converter 52 for up-converting the control information inputted from the modulator block 40 to a radio frequency, and transmitting it from the antenna 60.

The demodulator block 70 includes an AD converter (not shown) for converting the analog data from the RF block 50 into digital data (serial data), a serial/parallel converter 71 for converting the serial data from the AD converter into parallel data, and an FFT portion 72 for performing given demodulation processing by applying FFT to the parallel data from the serial/parallel converter 71, and outputting a plurality of radio resources R(1) to R(N). Also, the modulator block 40 includes an IFFT portion 42 for performing given modulation processing by applying IFFT (Inverse Fast Fourier Transform) to a plurality of radio resources R(1) to R(N) outputted from the radio resource assigning block 92, and outputting them as parallel data, a serial/parallel converter 41 for converting the parallel data outputted from the IFFT portion 42 to output serial data, and a DA converter (not shown) for converting the serial data (digital data) from the serial/parallel converter 41 into analog data. The given modulation processing is not limited to IFFT, but it can be IDFT (Inverse Discrete Fourier Transform). Also, the given demodulation processing is not limited to FFT, but it can be DFT.

The FFT portion 72 performs OFDM demodulation processing by applying FFT to the parallel data inputted from the serial/parallel converter 71, and it outputs a plurality of radio resources R(1) to R(N). The radio resources R(1) to R(N) outputted from the FFT portion 72 are inputted to the transmission path estimating block 91. The transmission path estimating block 91 estimates the transmission path characteristic of each subcarrier from the inputted radio resources R(1) to R(N), and informs the radio resource assigning block 92 about the characteristic. As mentioned earlier, this estimation of transmission path characteristic is achieved, for example, by obtaining a phase difference with a known sequential signal. Then, on the basis of the transmission path characteristic of each subcarrier provided from the transmission path estimating block 91, the radio resource assigning block 92 assigns the radio resources as shown in FIGS. 12 and 13, for example.

Figure 15:
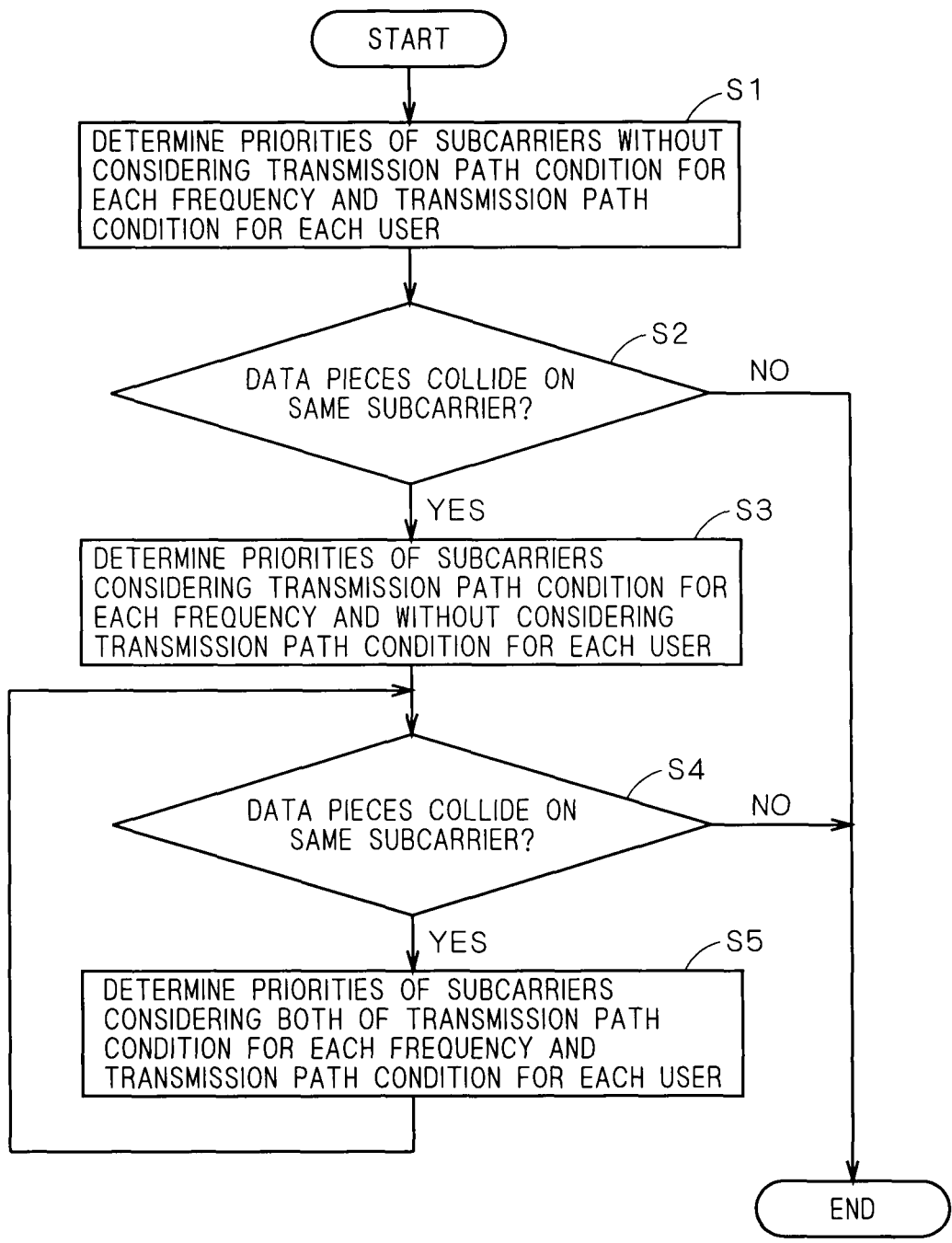
FIG. 15 A flowchart illustrating the operation of the base station of the second preferred embodiment.

FIG. 15 is a flowchart illustrating the operation of the base station 100b shown in FIG. 14.

In step S1, the priorities of the subcarriers are determined, without considering the propagating path characteristic that depends on frequency as described with FIG. 12, and without considering the transmission path characteristic that differs among user groups as described with FIG. 13. Thus, the priorities of the subcarriers are determined as shown in FIG. 7, for example. The flow then moves to step S2.

In step S2, a check is made to see whether multiple pieces of contention data collide on a same subcarrier when the pieces of contention data are transmitted with the priorities determined in step S1. When a collision occurs, it is necessary to modify the priorities determined in step S1, and so the flow moves to step S3; when no collision occurs, it is not necessary to modify the priorities determined in step S1, and so the operation is ended.

In step S3, subcarriers that caused no collision in step S2 are excluded, and the priorities of subcarriers are determined by considering the transmission path characteristic that differs depending on frequency as described with FIG. 12, without considering the transmission path characteristic that differs among the user groups as described with FIG. 13. That is, the radio resource assigning block 92 divides the band of all subcarriers into three bands 310 to 330, and sets relatively high priorities in the bands 310 to 330 of higher communication quality, and sets relatively low priorities in the band 320 of lower communication quality. Then, when the data to be transmitted is serial data, the radio resource assigning block 92 converts it to parallel data (it does not convert data when the data to be transmitted is parallel data), and inputs it to the IFFT portion 42. Thus, the priorities of the subcarriers are determined as shown in FIG. 12. The flow then moves to step S4.

In step S4, a check is made to see whether multiple pieces of contention data collide on a same subcarrier when the pieces of contention data are transmitted with the priorities determined in step S3. When a collision occurs, it is necessary to modify the priorities determined in step S3, and so the flow moves to step S5; when no collision occurs, it is not necessary to modify the priorities determined in step S3, and so the operation is ended.

In step S5, subcarriers that caused no collision in step S4 are excluded, and the priorities of subcarriers are determined by considering both of the frequency-dependent transmission path characteristic as described with FIG. 12 and the user-group-dependent transmission path characteristic as described with FIG. 13. That is, the communication quality of each subcarrier is measured; then, for example, when a user group that is assigned the priority 1 in a certain band fails to demodulate contention data when no collision of contention channels occurs, then the priorities are changed such that the user group is assigned the priority 1 for a subcarrier in another band. Also, in order to measure the user-group-dependent transmission path characteristic, the user groups A to C transmit part of contention data also in the band 320 in which the communication quality was judged to be low in step S3 (i.e. in FIG. 12). For example, the user groups A, B and C transmit contention data respectively on the subcarriers f4, f5 and f6 at which the user groups A, B and C have the highest priorities in the band 320. This processing is repeated, so as to change the subcarrier priorities to those as shown in FIG. 13. Also, when some contention channels collide, the priorities as shown in FIG. 12 can be changed to the priorities as shown in FIG. 13, by estimating the transmission paths of subcarriers that did not collide, and by measuring the communication quality for each band and for each user group. Then the flow moves to step S4.

The assignment is achieved according to the algorithm described above, whereby proper priorities are assigned to the subcarriers by considering the transmission path characteristics that differ among frequencies and among user groups.

Thus, the radio communications system and radio communications method of this preferred embodiment achieve appropriate assignment of subcarriers by considering transmission path characteristics that differ among frequencies and among user groups, whereby collisions of contention channels can be reduced easily.

Third Preferred Embodiment

The subcarriers used as radio resources may be designated by their subcarrier numbers that are allocated to a plurality of subcarriers arranged at equal intervals in the frequency domain (a series of subcarriers) in ascending order from the lowest frequency to the highest frequency, or they can be designated by subcarrier allocation information including given parameters, etc.

FIG. 16 is a block diagram illustrating the functions of a base station 100c in a radio communications system according to a third preferred embodiment. As compared with FIG. 4, the configuration of FIG. 16 includes a subcarrier allocation information storing block 93 that inputs the subcarrier allocation information to the modulation block 40 (some parts are not shown for the sake of convenience). The subcarrier allocation information storing block 93 stores subcarrier allocation information that contains given parameters etc. for designating the subcarriers used as radio resources. The subcarrier allocation information inputted from the subcarrier allocation information storing block 93 is subjected to given modulation processing in the modulator block 40 and inputted to the RF block 50. Receiving the subcarrier allocation information from the modulator block 40, the RF block 50 up-converts it to a radio frequency in its built-in up-converter (not shown in FIG. 16), and transmits it to the mobile station 200 from the antenna 60.

In the mobile station 200 shown in FIG. 5, the subcarrier allocation information sent from the base station 100c is received at the antenna 110, and the RF block 120 down-converts it to an analog baseband signal and inputs it to the demodulator block 130. The demodulator block 130 applies given demodulation processing (AD conversion etc.) to the subcarrier allocation information inputted from the RF block 120, and inputs it to the message analyzing block 140. The message analyzing block 140 analyzes the subcarrier allocation information inputted from the demodulator block 130, and extracts the given parameters etc. contained in the subcarrier allocation information. Then, on the basis of the given parameters etc., it extracts the subcarrier numbers to be used as radio resources, and inputs it to the radio resource assigning block 170. As shown in FIG. 17, the subcarrier allocation information may use a control channel that accompanies the data channel. That is, the I-ch is used as a data channel for accommodating broadcast information (which is received from the base station 100 when the mobile station 200 is in a waiting state), synchronization information, etc, while the Q-ch is used as a control channel for accommodating the subcarrier allocation information etc. This is similar to using the I-ch as DPDCH and the Q-ch as DPCCH when the I-ch is used as a data channel in W-CDMA. However, this is not restrictive, and the subcarrier allocation information may be accommodated in the I-ch as broadcast information.

Figure 18:
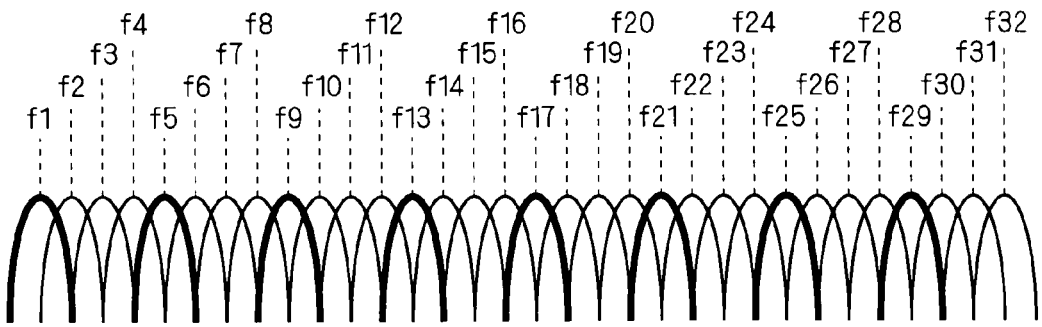
FIG. 18 A diagram illustrating a first example of the designation of subcarriers in the radio communications system of the third preferred embodiment.

FIG. 18 is a diagram illustrating a first example of the designation of subcarriers in the radio communications system of this preferred embodiment.

In FIG. 18, the subcarrier allocation information includes the first subcarrier number Sa=1 (which can be a frequency), the total number of subcarriers Sb=8, the interval between adjacent subcarriers Sc=4 (which can be a difference of subcarrier numbers or a bandwidth), and an operational expression S=Sa+Sc×n (n=0 to (Sb−1)). By using the parameters and operational expression, the message analyzing block 140 of the mobile station 200 obtains subcarrier numbers S=1+4×n (n=0 to 7)=1, 5, 9, 13, 17, 21, 25, 29.

That is, in FIG. 18, the subcarriers f1 to f32 form a series of subcarriers of the present invention. Also, the subcarriers f1, f5, f9, f13, f17, f21, f25, f29 are resource subcarriers of the present invention, and they form a series of resource subcarriers.

When the interval Sc is described in terms of bandwidth, in FIG. 18, for example, when the time distance between the subcarrier f1 and the subcarrier f2 is ½ of symbol time Ts (i.e. when the time distance is Ts/2), the interval Sc expressed in terms of bandwidth is (1/(Ts/2))/4=1(2Ts). Also, when Sa=2 is set under the above-described conditions, the subcarrier numbers S=2+4×n (n=0 to 7)=2, 6, 10, 14, 18, 22, 26, 30 are obtained. Other subcarrier numbers can be obtained in the same way by setting Sa=3 or Sa=4.

In the designation of radio resources of the first example shown in FIG. 18, when the subcarriers are assigned to four kinds of user groups, it is possible to prevent collisions of contention channels by respectively assigning the subcarriers corresponding to Sa=1, 2, 3, 4. When there are five or more kinds of user groups, it is possible to reduce the collisions of contention channels by setting the priorities of assignment of subcarriers as described in the first preferred embodiment. That is, for example, S=1, 5, 9, 13, 17, 21, 25, 29 shown in FIG. 18 are substituted for S=1 to 8 shown in FIG. 2.

In the designation of radio resources of the first example, the subcarriers used as radio resources are designated not by the subcarrier numbers but by the subcarrier allocation information including given parameters etc., whereby the amount of information can be reduced. For example, when the subcarriers of FIG. 18 are designated by the subcarrier numbers, eight pieces of information are needed (S=1, S=5, S=9, S=13, S=17, S=21, S=25, S=29), but only three pieces of information (Sa=1, Sb=8, Sc=4) are needed when the subcarriers are designated by the subcarrier allocation information. It is thus possible to reduce the amount of data to be transmitted from the base station 100 to the mobile station 200.

Figure 19:
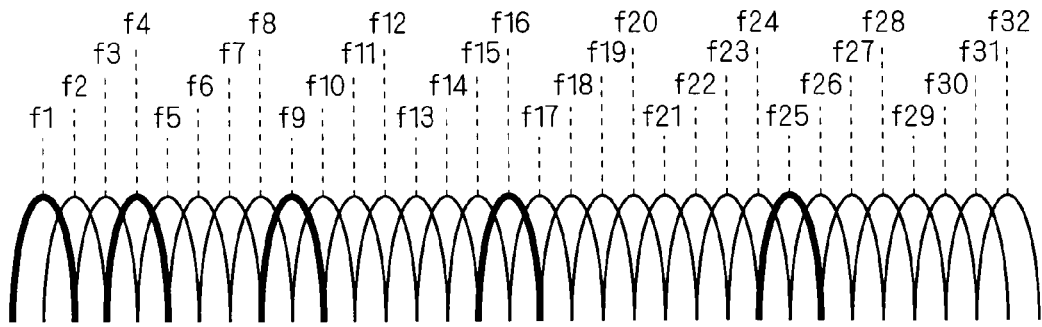
FIG. 19 A diagram illustrating a second example of the designation of subcarriers in the radio communications system of the third preferred embodiment.

FIG. 19 is a diagram illustrating a second example of the designation of radio resources in the radio communications system of this preferred embodiment.

In FIG. 19, the subcarrier allocation information is composed of the first subcarrier number Sa=1 (which can be a frequency), the total number of subcarriers Sb=5, and an operational expression $S=n^2$ (n=Sa to Sa+(Sb−1)). By using these parameters and operational expression, the message analyzing block 140 of the mobile station 200 obtains the subcarrier numbers $S=n^2$ (n=1 to 5)=1, 4, 9, 16, 25. The second example performs the same operation as the first example, except for the parameters and operational expression, and offers the same effects. Also, in the second example, as in the first example, collisions of contention channels can be reduced by setting the priorities of assignment of subcarriers.

Figure 20:
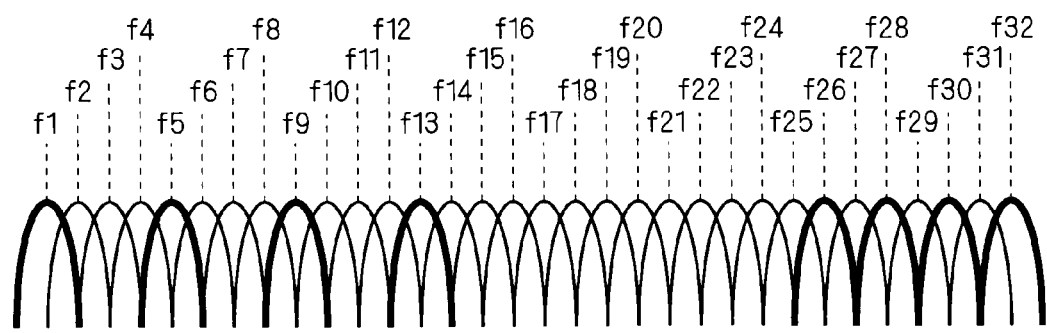
FIG. 20 A diagram illustrating a third example of the designation of subcarriers in the radio communications system of the third preferred embodiment.

FIG. 20 is a diagram illustrating a third example of the designation of radio resources in the radio communications system of this preferred embodiment. The third example is characterized in that the subcarriers are composed of a plurality of sets, in a situation like that of the first example.

In FIG. 20, the subcarriers include a first set that includes S=1, 5, 9, 13 and a second set that includes S=26, 28, 30, 32. Accordingly, the subcarrier allocation information about the first set is composed of the first subcarrier number $Sa_1=1$, the total number of subcarriers $Sb_1=4$, the interval between adjacent subcarriers $Sc_1=4$, and an operational expression $S_1=Sa_1+Sc_1 \times n$ (n=0 to ($Sb_1-1$)), and that about the second set is composed of the first subcarrier number $Sa_2=26$, the total number of subcarriers $Sb_2=4$, the interval between adjacent subcarriers $Sc_2=2$, and an operational expression $S_2=Sa_2+Sc_2 \times n$ (n=0 to ($Sb_2-1$)). The third example performs the same operation and offers the same effects as the first example, except for the fact that the subcarriers are formed of a plurality of sets. It is possible also in the third example, as in the first example, to reduce collisions of contention channels by setting the priorities of assignment of subcarriers. That is, S=1, 5, 9, 13, 26, 28, 30, 32 shown in FIG. 20 are substituted for S=1 to 8 shown in FIG. 2, for example.

That is, in FIG. 20, the subcarriers f1 to f32 form a series of subcarriers of the present invention. The subcarriers f1, f5, f9, f13, f26, f28, f30, f32 are resource subcarriers of the invention, and form a series of resource subcarriers. Also, the subcarriers f1, f5, f9, f13, and the subcarriers f26, f28, f30, f32, each form a first series of resource subcarriers of the invention.

The description above has shown an example in which the number of sets is two and the first set and the second set are separated apart from each other. However, the number of sets is not limited to two, but it can be three or more, and the sets may overlap each other. It is thus possible to designate a more variety of series of subcarriers with operational expressions.

When the frequency band required by a series of resource subcarriers is large (when there is a large difference between the highest frequency and the lowest frequency of all resource subcarriers contained in a series of resource subcarriers), then the possibility of occurrence of multi-path fading becomes higher; in this case, the influence of multi-path fading can be reduced by narrowing the frequency band of each set, by increasing the number of sets and reducing the number of subcarriers of each set.

Also, when the frequency of a series of subcarriers is high (when the average frequency of all resource subcarriers contained in a series of resource subcarriers is high), then the frequency of occurrence of multi-path fading becomes higher at a same moving speed; in this case, too, the influence of multi-path fading can be reduced by narrowing the frequency band of each set, by increasing the number of sets and reducing the number of subcarriers of each set.

Also, when the subcarriers in a series of subcarriers are recognized as being irregularly arranged when they are designated by the subcarrier numbers, they can be divided into a plurality of sets that conform to given rules (operational expressions) so that each set can be recognized as being regularly arranged and FFT or IFFT can be applied collectively. This facilitates processing.

The description above has shown examples in which all subcarriers are designated by an operational expression or expressions (i.e. by the subcarrier allocation information), but only part of a series of subcarriers may be designated by the subcarrier allocation information, with the remaining ones designated by their subcarrier numbers.

In this way, in the radio communications system and radio communications method of this preferred embodiment, the subcarriers to be used as radio resources are designated not by the subcarrier numbers but by subcarrier allocation information that contains given parameters etc. This reduces the amount of information to be transmitted about the combination of assigned radio resources. This reduces the amount of data to be transmitted from the base station 100 to the mobile station 200.

The description above has shown examples in which the subcarrier numbers are announced from the base station 100 to the mobile station 200, but this is not restrictive and this preferred embodiment is applicable also when the subcarrier numbers are announced from the mobile station 200 to the base station 100.

The operational expressions used in this preferred embodiment are not limited to those described above, but they can be any expressions that can represent the subcarrier numbers of a series of subcarriers used as radio resources.

Fourth Preferred Embodiment

The subcarriers to be used as radio resources may all have an equal bandwidth, or part of them may have a different bandwidth.

FIG. 21 is a diagram illustrating the designation of subcarriers in a radio communications system according to a fourth preferred embodiment.

As shown in FIG. 21, the subcarriers f1 to f26 are divided into a first set of subcarriers f1 to f14 having a relatively narrow bandwidth, a second set of subcarriers f15 to f18 having a relatively wide bandwidth, and a third set of subcarriers f19 to f26 having a relatively narrow bandwidth. Individual subcarriers in each set have the same bandwidth. The bandwidth of the subcarriers f1 to f14 and the bandwidth of the subcarriers f19 to f26 may be equal or different. In FIG. 21, the subcarriers f1, f5, f9, f13 in the first set of subcarriers f1 to f14 are used as radio resources, all subcarriers f15 to f18 in the second set of subcarriers f15 to f18 are used as radio resources, and the subcarriers f20, f22, f24, f26 in the third set of subcarriers f19 to f26 are used as radio resources.

That is, in FIG. 21, for example, the subcarriers f1, f5, f9, f13, and the subcarriers f20, f22, f24, f26, each form a second series of resource subcarriers of the present invention, and the subcarriers f15 to f18 form a third series of resource subcarriers of the present invention.

Figure 22:
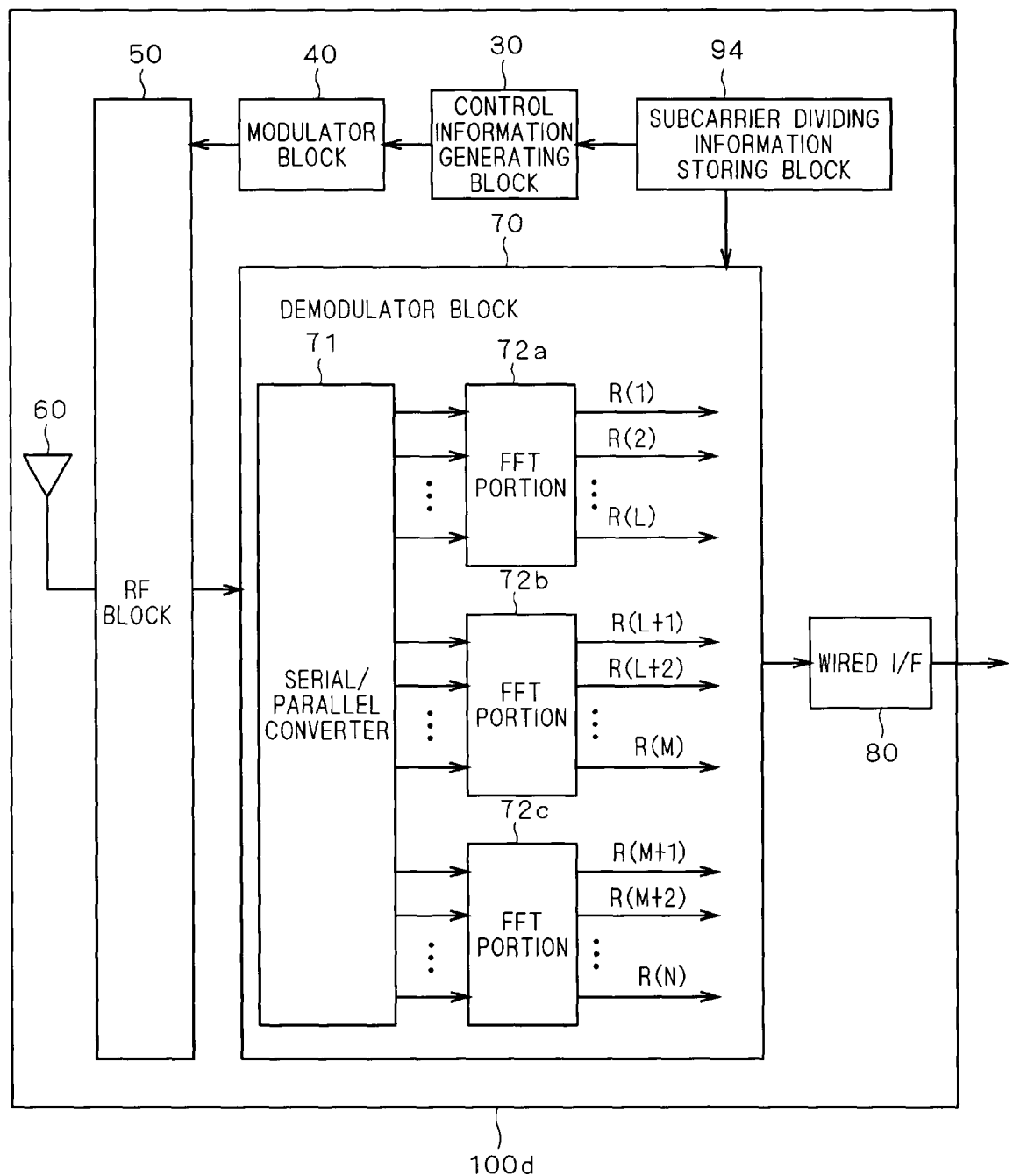
FIG. 22 A block diagram illustrating the functions of a base station in the radio communications system of the fourth preferred embodiment.

FIG. 22 is a block diagram illustrating the functions of a base station 100*d* in the radio communications system of the fourth preferred embodiment. As compared with FIG. 4, the configuration of FIG. 22 includes a subcarrier dividing information storing block 94 for providing subcarrier dividing information to the control information generating block 30, and FIG. 22 shows the function of the demodulator block 70 in more detail (some parts are not shown for the sake of convenience). In FIG. 22, the demodulator block 70 includes an AD converter not shown, one serial/parallel converter 71 connected to the AD converter, and three FFT portions 72*a*, 72*b* and 72*c* connected to the serial/parallel converter 71. The subcarrier dividing information storing block 94 stores subcarrier dividing information for dividing the subcarriers used as radio resources into a plurality of sets. The subcarrier dividing information includes the bandwidth of subcarriers of each set, the first subcarrier number of each set, and the total number of subcarriers of each set. The control information generating block 30 generates control information of a radio format with the subcarrier dividing information inputted from the subcarrier dividing information storing block 94, and inputs it to the modulator block 40. The modulator block 40 applies given modulation processing to the control information inputted from the control information generating block 30, and inputs it to the RF block 50. The RF block 50 receives the control information from the modulator block 40, up-converts it to a radio frequency in its built-in up-converter (not shown in FIG. 22), and transmits it to the mobile station 200 from the antenna 60.

In the mobile station 200 shown in FIG. 5, the control information sent from the base station 100 is received at the antenna 110, and the RF block 120 down-converts it to an analog baseband signal, and inputs it to the demodulator block 130. The demodulator block 130 applies given demodulation processing (AD conversion etc.) to the control information inputted from the RF block 120, and inputs it to the message analyzing block 140. The message analyzing block 140 analyzes the control information inputted from the demodulator block 130, and extracts the subcarrier dividing information; then, by using a method as described in the third preferred embodiment, the message analyzing block 140 generates second subcarrier dividing information that contains the subcarrier numbers used as radio resources among the subcarriers f1 to f26 and the bandwidths of the first to third sets, and inputs the second subcarrier dividing information to the radio resource assigning block 170. Then, on the basis of the second subcarrier dividing information inputted from the message analyzing block 140, the radio resource assigning block 170 assigns the contention data, inputted from the amount-of-data determining block 160, to given subcarriers as a contention channel, and inputs it to the modulator block 180. The modulator block 180 applies given modulation processing (DA conversion etc.) to the contention data inputted from the radio resource assigning block 170, and inputs it to the RF block 120. The RF block 120 receives the contention data inputted from the modulator block 180, up-converts it to a radio frequency, and transmits it to the base station 100 from the antenna 110.

In the base station 100*d* shown in FIG. 22, the contention data sent from the mobile station 200 is received at the antenna 60, and the RF block 50 down-converts it to an analog baseband signal in its built-in down-converter (not shown in FIG. 22), and inputs it to the demodulator block 70. The demodulator block 70, having an AD converter not shown, applies given demodulation processing (AD conversion etc.) to the contention data inputted from the RF block 50 so as to convert it to digital data (serial data), and it is inputted to the serial/parallel converter 71. Then, on the basis of the second subcarrier dividing information, the serial/parallel converter 71 provides the contention data related to the first set of subcarriers f1, f5, f9, f13 to the FFT portion 72*a*, provides the contention data related to the second set of subcarriers f15 to f18 to the FFT portion 72*b*, and provides the contention data related to the third set of subcarriers f20, f22, f24, f26 to the FFT portion 72*c*.

In general, with a wide bandwidth, it is possible to alleviate interference from other base stations by slowing signal transmission rate and lowering coding rate. Accordingly, the bandwidth can be enlarged, like that of the subcarriers f15 to f18, in a frequency band that suffers from serious interference from other base stations.

Also, the subcarrier f14 located at the boundary between the first set and the second set, and the subcarrier f19 located at the boundary between the second set and the third set, are not used as radio resources, whereby center frequency differences are provided between the sets of different frequencies. This reduces interference between the sets.

The description above has illustrated a scheme in which, with the subcarriers f15 to f18 having a wider bandwidth, the signal transmission rate is slowed and the coding rate is reduced to alleviate interference from other base stations, but this is not restrictive, and the spreading factor may be increased, or the modulation rate may be reduced.

Figure 23:
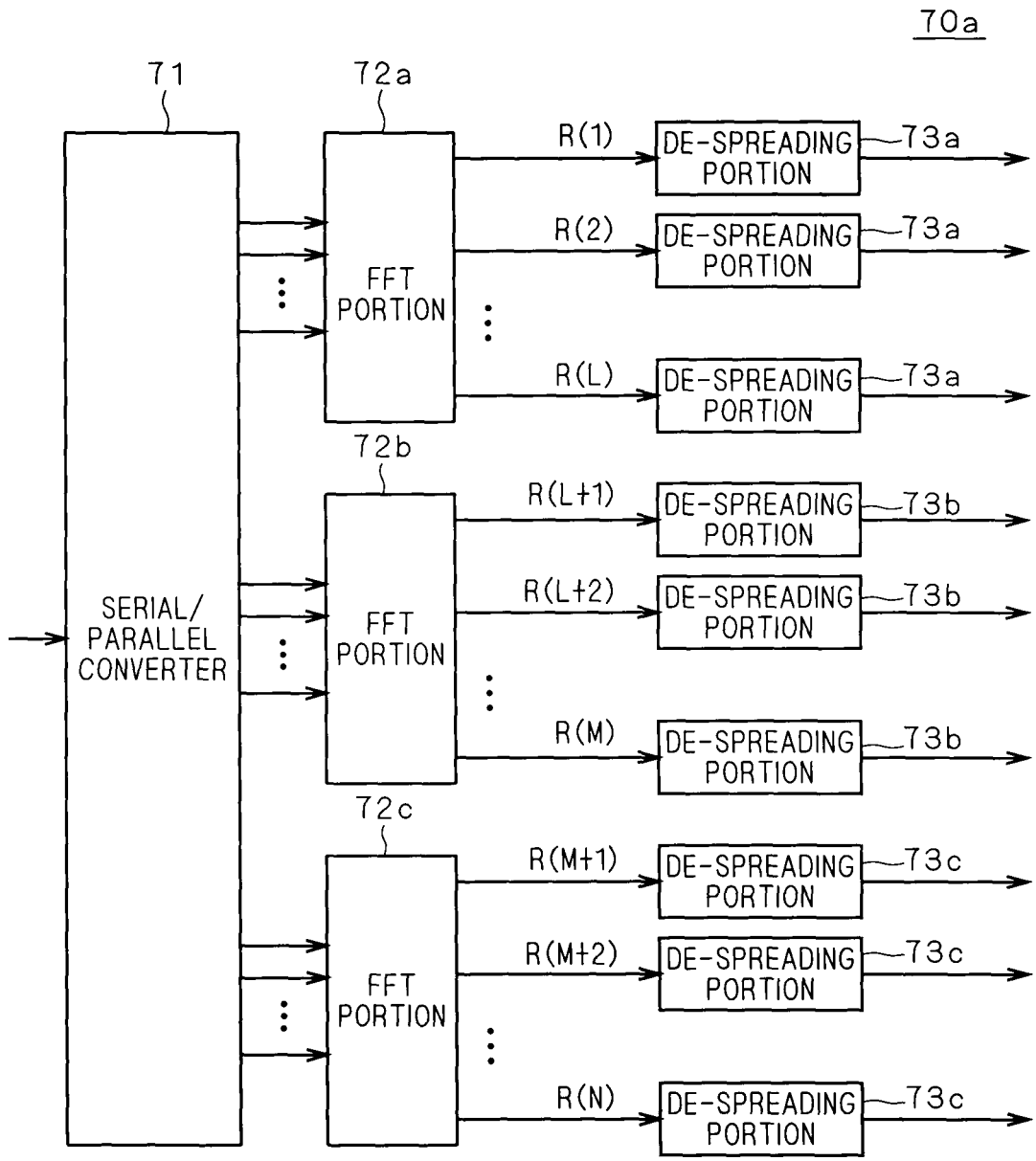
FIG. 23 A block diagram illustrating the functions of a base station in the radio communications system of the fourth preferred embodiment.

FIG. 23 is a block diagram illustrating the functions of a demodulator block 70a in a case in which OFDM subcarriers are used as radio resources. FIG. 23 illustrates the demodulator block 70 of FIG. 22 with de-spreading portions 73a to 73c connected respectively to the FFT portions 72a to 72c (for the sake of convenience, some parts are not shown). Increasing the spreading factor is lengthening the spread codes for the multiplication in the de-spreading portions 73a to 73c; accordingly, on the basis of the second subcarrier dividing information, the spread code is shortened in the de-spreading portions 73a corresponding to the narrower-band subcarriers f1, f5, f9, f13, the spread code is lengthened in the de-spreading portions 73b corresponding to the wider-band subcarriers f15 to f18, and the spread code is shortened in the de-spreading portions 73c corresponding to the narrower-band subcarriers f20, f22, f24, f26. The spreading factors for the de-spreading portions 73a to 73c are announced to the mobile station 200 from the base station 100 through a broadcast channel, for example. After receiving the spreading factors and the subcarrier dividing information, the mobile station 200 performs OFDM transmission of contention channels to the base station 100 on the basis of the notification.

In FIG. 23, as in FIG. 22, on the basis of the second subcarrier dividing information, the serial/parallel converter 71 provides the contention data related to the first set of subcarriers f1, f5, f9, f13 to the FFT portion 72a, provides the contention data related to the second set of subcarriers f15 to f18 to the FFT portion 72b, and provides the contention data related to the third set of subcarriers f20, f22, f24, f26 to the FFT portion 72c. Thus, the subcarrier f14 located at the boundary between the first set and the second set, and the subcarrier f19 located at the boundary between the second set and the third set, are not used as radio resources, whereby interference between the individual sets is reduced. Also, the signal transmission rate in a frequency band that suffers serious interference can be slowed, whereby interference from other base stations is alleviated.

In this way, according to the radio communications system and the radio communications method of this preferred embodiment, a series of subcarriers is divided into a plurality of sets according to their bandwidths. Thus, it is possible to perform communication with reduced interference even between one base station 100 and a plurality of mobile stations 200 using different bandwidths, by enlarging the bandwidth, and reducing the coding rate or increasing the spreading factor, in a frequency band that suffers serious interference from other base stations. This makes it possible to reduce the number of transmissions of the amount of data of the preamble signal, e.g. the Pilot signal, that is sent to measure phase shift caused by interference. This allows reduction of power used. Also, it is possible to use a combination of different OFDM schemes that use subcarriers of different bandwidths.

In this preferred embodiment, as in the first preferred embodiment, it is possible to reduce the collisions of contention channels by setting the priorities of assignment of subcarriers.

While the invention has been described in detail, the foregoing description is in all aspects illustrative and not restrictive. It is understood that numerous other modifications and variations can be devised without departing from the scope of the invention.

The invention claimed is:

1. A radio communications system comprising:
   a plurality of radio communications devices, wherein
   said plurality of radio communications devices are configured to perform a plurality of radio communications by using a plurality of radio resources between said plurality of radio communications devices,
   said plurality of radio resources correspond to a plurality of subcarriers that are assigned in different orders between one of said plurality of radio communications and another one of said plurality of radio communications, such that the plurality of radio communication devices are classified into different user groups having different priorities assigned to the plurality of subcarriers in a way that none of the user groups have a same priority assigned to a same subcarrier and radio communication devices of different user groups communicate with a same base station, and
   said priority is a priority in assigning a subcarrier to the radio communications.

2. A radio communications system comprising:
   a plurality of radio communications devices, wherein
   said plurality of radio communications devices can perform a plurality of radio communications, between said plurality of radio communications devices, by using a series of subcarriers in which a plurality of subcarriers are arranged in a frequency domain, and
   subcarrier allocation information for notifying a series of resource subcarriers, in which a plurality of resource subcarriers used as radio resources in one of said plurality of radio communications are arranged in a frequency domain in said series of subcarriers, to a radio communication device using said series of resource subcarriers, the subcarrier allocation information includes a given parameter group and a given operational expression.

3. The radio communications system according to claim 2, wherein
   said given parameter group includes an interval between adjacent ones of said plurality of resource subcarriers in a frequency domain in said series of resource subcarriers, and
   said operational expression is represented as a linear expression of said interval.

4. The radio communications system according to claim 2, wherein
   said operational expression is represented as a quadratic expression of subcarrier numbers that are assigned to said series of subcarriers in ascending order from a low frequency to a high frequency.

5. The radio communications system according to claim 2, wherein
   said series of resource subcarriers includes plural sets of first series of resource subcarriers.

6. The radio communications system according to claim 5, wherein
   the number of said plural sets of first series of resource subcarriers is determined according to a frequency bandwidth of said series of resource subcarriers.

7. The radio communications system according to claim 5, wherein
   the number of said plural sets of first series of resource subcarriers is determined according to an average frequency of said series of resource subcarriers.

8. The radio communications system according to claim 5, wherein
said plural sets of first series of resource subcarriers include a second series of resource subcarriers and a third series of resource subcarriers, and
a bandwidth of a subcarrier of said plurality of subcarriers, included in said second series of resource subcarriers, and a bandwidth of a subcarrier of said plurality of subcarriers, included in said third series of resource subcarriers, are different from each other.

9. A radio communications system comprising:
a plurality of radio communications devices, wherein
said plurality of radio communications devices can perform a plurality of radio communications, between said plurality of radio communications devices, by using a series of subcarriers in which a plurality of subcarriers are arranged in a frequency domain,
in said series of subcarriers, a series of resource subcarriers, in which a plurality of resource subcarriers used as radio resources in one of said plurality of radio communications are arranged in a frequency domain, includes a second series of resource subcarriers and a third series of resource subcarriers, and
a width of a bandwidth of one subcarrier included in said second series of resource subcarriers, and a width of a bandwidth of one subcarrier included in said third series of resource subcarriers are different from each other.

10. The radio communications system according to claim 9, wherein
a band of said series of subcarriers includes a first part band and a second part band that suffers larger interference from another radio communications system than said first part band,
said third series of resource subcarriers has a wider bandwidth than a bandwidth of said second series of resource subcarriers, and
said third series of resource subcarriers is allocated to said second part band.

11. The radio communications system according to claim 10, wherein
said third series of resource subcarriers is coded with a lower coding rate than said second series of resource subcarriers.

12. The radio communications system according to claim 10, wherein
said third series of resource subcarriers is modulated with a lower modulation rate than said second series of resource subcarriers.

13. The radio communications system according to claim 10, wherein
said third series of resource subcarriers is spectrum-spread with a higher spreading factor than said second series of resource subcarriers.

14. The radio communications system according to claim 9, wherein
said second series of resource subcarriers and said third series of resource subcarriers are adjacent to each other in the frequency domain, and
a band where no said resource subcarrier is allocated is provided at a boundary between said second series of resource subcarriers and said third series of resource subcarriers.

15. A radio communications method capable of performing radio communications between a plurality of radio communication devices by using a plurality of radio resources, the method comprising:
performing a first radio communication between radio communication devices by using said plurality of radio resources; and
performing a second radio communication between radio communication devices by using said plurality of radio resources,
wherein said plurality of radio resources correspond to a plurality of subcarriers that are assigned in different orders between said first radio communication and said second radio communication, such that the plurality of radio communication devices are classified into different user groups having different priorities assigned to the plurality of subcarriers in a way that none of the user groups have a same priority assigned to a same subcarrier and radio communication devices of different user groups communicate with a same base station, and
wherein said priority is a priority in assigning a subcarrier to the radio communications.

16. A radio communications method capable of performing a plurality of radio communications by using a series of subcarriers in which a plurality of subcarriers are arranged in a frequency domain, the method comprising:
performing a first radio communication by using said series of subcarriers; and
performing a second radio communication by using said series of subcarriers,
wherein, subcarrier allocation information for notifying a series of resource subcarriers, in which a plurality of resource subcarriers used as radio resources in one of said first and said second radio communications are arranged in a frequency domain in said series of subcarriers, to a radio communications device using said series of resource subcarriers, the subcarrier allocation information includes a given parameter group and a given single operational expression.

17. A radio communications method capable of performing a plurality of radio communications by using a series of subcarriers in which a plurality of subcarriers are arranged in a frequency domain, the method comprising:
performing a first radio communication by using said series of subcarriers; and
performing a second radio communication by using said series of subcarriers,
wherein, in said series of subcarriers, a series of resource subcarriers, in which a plurality of resource subcarriers used as radio resources in one of said first and said second radio communications are arranged in a frequency domain, includes a second series of resource subcarriers and a third series of resource subcarriers, and
a width of a bandwidth of one subcarrier included in said second series of resource subcarriers and a width of a bandwidth of one subcarrier included in said third series of resource subcarriers are different from each other.

* * * * *